United States Patent
Li et al.

(10) Patent No.: US 9,870,272 B2
(45) Date of Patent: Jan. 16, 2018

(54) COLLECTING STREAMING EVENT DATA FROM APPLICATIONS DEPLOYED IN A DISTRIBUTED COMPUTING ENVIRONMENT

(71) Applicant: Pivotal Software, Inc., San Fracisco, CA (US)

(72) Inventors: Xiong Li, Beijing (CN); Xiaoming Gao, Beijing (CN); Ye Li, Beijing (CN); Leng Han, Beijing (CN); Lei Zhu, Beijing (CN)

(73) Assignee: Pivotal Software, Inc., Palo Alto, CA (US)

( * ) Notice: Subject to any disclaimer, the term of this patent is extended or adjusted under 35 U.S.C. 154(b) by 0 days.

(21) Appl. No.: 14/539,049

(22) Filed: Nov. 12, 2014

(65) Prior Publication Data
US 2015/0135193 A1    May 14, 2015

Related U.S. Application Data

(63) Continuation of application No. PCT/CN2013/086982, filed on Nov. 12, 2013.

(51) Int. Cl.
| | |
|---|---|
| G06F 9/46 | (2006.01) |
| H04L 12/28 | (2006.01) |
| G06F 15/16 | (2006.01) |
| G06F 15/173 | (2006.01) |
| G06F 9/50 | (2006.01) |

(52) U.S. Cl.
CPC .... *G06F 9/5083* (2013.01); *G06F 2209/5022* (2013.01)

(58) Field of Classification Search
None
See application file for complete search history.

(56) References Cited

U.S. PATENT DOCUMENTS 7,818,386 B2 * 10/2010 Surlaker ............... H04L 1/1874
709/207
2004/0167912 A1    8/2004 Tsui et al.
(Continued)

FOREIGN PATENT DOCUMENTS

| CN | 101014002 | 8/2007 |
| CN | 103036961 | 4/2013 |
| WO | WO 2013/033123 | 3/2013 |

OTHER PUBLICATIONS

International Search Report and Written Opinion in International Application No. PCT/CN2013/086982, dated Aug. 8, 2014, 11 pages.

*Primary Examiner* — Bing Zhao
(74) *Attorney, Agent, or Firm* — Fish & Richardson P.C.

(57) ABSTRACT

Methods, systems, and apparatus, including computer programs encoded on computer storage media, for distributed data management. One of the methods includes receiving a plurality of feeds of streaming event data and routing feed data from each of the feeds to a respective channel of a plurality of channels, each of the channels being configured to store feed data until the feed data is consumed by a data sink, including routing feed data from a first feed to a first channel. A load metric for the first channel is determined to exceed a threshold. In response, a second channel is allocated for the first feed and feed data is redirected from the first feed to the second channel instead of the first channel.

27 Claims, 4 Drawing Sheets

(56) References Cited

U.S. PATENT DOCUMENTS

| | | | | |
|---|---|---|---|---|
| 2006/0239271 A1* | 10/2006 | Khasnabish | ............ | H04L 45/00 370/395.21 |
| 2012/0284768 A1* | 11/2012 | Sabin | ...................... | H04L 63/20 726/1 |

* cited by examiner

US 9,870,272 B2

COLLECTING STREAMING EVENT DATA FROM APPLICATIONS DEPLOYED IN A DISTRIBUTED COMPUTING ENVIRONMENT

BACKGROUND

This specification relates to cloud computing.

In cloud computing, data can be distributed to a system of multiple computers connected by one or more communications networks. Each computer can host one or more servers, each of which processes a portion of data. The servers can process the data in parallel. Such a distributed system can handle web-oriented and data-intensive applications deployed in a virtualized environment. For example, a distributed system can be configured to host a multi-tenant computing service over the Internet. A software-as-a-service (SaaS) provider, for example, can run an instance of its application on the distributed system and provide access to multiple tenants.

SUMMARY

This specification describes a distributed computing system that provides a log collection engine with high availability and load balancing capabilities. The distributed computing system can perform log collection for a system hosting multiple applications in a multi-tenant environment.

In general, one innovative aspect of the subject matter described in this specification can be embodied in methods that include the actions of receiving a plurality of feeds of streaming event data; routing feed data from each of the feeds to a respective channel of a plurality of channels, each of the channels being configured to store feed data until the feed data is consumed by a data sink, including routing feed data from a first feed to a first channel; determining that a load metric for the first channel exceeds a threshold; in response to determining that the load metric exceeds the threshold, allocating a second channel for the first feed; and redirecting feed data from the first feed to the second channel instead of the first channel. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions further include receiving a request from a first feed source to register the first feed; allocating the first channel for the first feed so that the first channel receives only data from the first feed; allocating a networking connection for the first feed, the networking connection being configured to receive feed data from the first feed source; and associating the networking connection with the first channel so that the distributed computing system routes the feed data from the first feed from the networking connection to the first channel. Redirecting feed data from the first feed to the second channel includes associating the networking connection with the second channel. The actions further include, after associating the networking connection with the second channel, deallocating the first channel so that one or more computing resources of the distributed computing system used by the first channel become available for one or more other channels. The distributed computing system hosts at least a first multi-tenant application configured to serve a plurality of tenants, and wherein receiving the request to register the first feed comprises receiving the request from a first tenant. The load metric for the first channel specifies an amount of network traffic or an amount of memory used by the first channel. The actions further include, in response to determining that the load metric exceeds the threshold, determining how many new channels are a sufficient number of new channels for the first feed based on an amount by which the load metric exceeds the threshold; allocating the sufficient number of new channels for the first feed; and redirecting feed data from the first feed to the new channels instead of the first channel. The actions further include sinking a respective output from each of the channels to a distributed file system for the distributed computing system. The actions further include sinking a respective output from each of the channels to a data parsing engine configured to perform data analytics on the feeds. Each of the channels comprises a software instance configured to store feed data in a local data store that is local to one or more computers or one or more clusters of computers in the distributed computing system, wherein the local data store comprises random access memory (RAM) or mass storage or both Particular embodiments of the subject matter described in this specification can be implemented to realize one or more advantages. A log collection engine can collect streaming event data in a multi-tenant environment. The log collection engine can have high availability by virtue of a load balancing engine that can allocate new channels for log collection in response to detecting a high load. The log collection engine can support log collection for big data services for analysis.

The details of one or more embodiments of the subject matter described in this specification are set forth in the accompanying drawings and the description below.

Other features, aspects, and advantages of the subject matter will become apparent from the description, the drawings, and the claims.

BRIEF DESCRIPTIONS OF DRAWINGS

Like reference numbers and designations in the various drawings indicate like elements.

DETAILED DESCRIPTION

Figure 1:
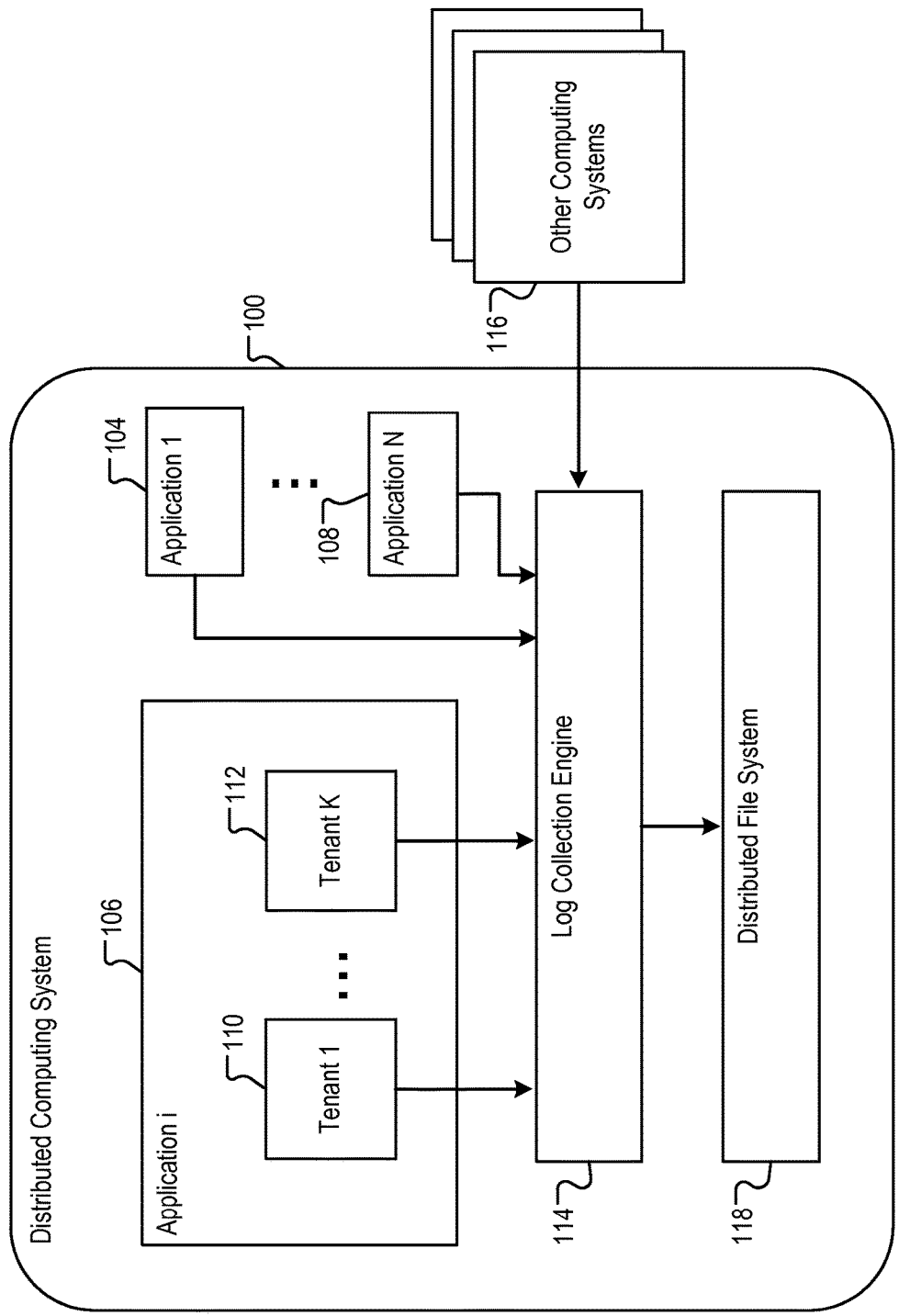
FIG. 1 is a block diagram of an example distributed computing system.

FIG. 1 is a block diagram of an example distributed computing system 100. The system includes multiple computers in one or more locations connected by one or more data communications networks. Each computer can be a physical computer or a virtual computer. The system can handle data intensive applications deployed in a virtualized environment.

The system executes N applications, including a first application 102, an ith application 104, and an Nth application 106. The applications can access distributed computing resources in the system without having knowledge of the underlying system architecture. The ith application is a multi-tenant application hosting a first tenant 110 through an Kth tenant 112.

For each tenant, the application can allocate a secure and exclusive virtual computing environment. The environment can include one or more layers of a software architecture, e.g., from a storage layer to a user interface layer. In some implementations, the system is configured to provide customizability to the tenants, e.g., regarding user interface elements or business rules, without providing customizability of the underlying application code.

The system includes a log collection engine 114. The log collection engine can collect, aggregate, and move large amounts of streaming event data. The log collection engine is configured to collect streaming event data from various sources.

The streaming event data can be log data, e.g., error or status log data, and other types of event data, e.g., network traffic data, social media data, email messages, and the like. The log collection engine can collect streaming event data from the applications and from individual tenants of the applications. In some implementations, the log collection engine is configured to collect streaming event data from one or more other computing systems 116.

The system includes a distributed file system 118, which generally is implemented on non-volatile mass storage memory, e.g., flash or disk memory. An example of the distributed file system 104 is the Hadoop™ Distributed File System (HDFS™). ("Hadoop" and "HDFS" are trademarks of the Apache Software Foundation.) The log collection engine is configured to move collected streaming event data into the distributed file system. The log collection engine can also be configured to move collected streaming event data into other types of data sinks, e.g., a data parsing engine configured to perform data analytics on the feeds.

Collecting streaming event data can use significant amounts of computing resources, e.g., memory and network bandwidth. In some cases, the load on the log collection engine can be difficult to predict. In particular, where the system is hosting multi-tenant applications, the load on the log collection engine can fluctuate significantly as the various tenants send streaming event data. The log collection engine can be configured to perform load balancing to provide high availability in systems hosting multi-tenant applications, for example, by monitoring channel loads and allocating new channels when channels are experiencing a high load.

Figure 2:
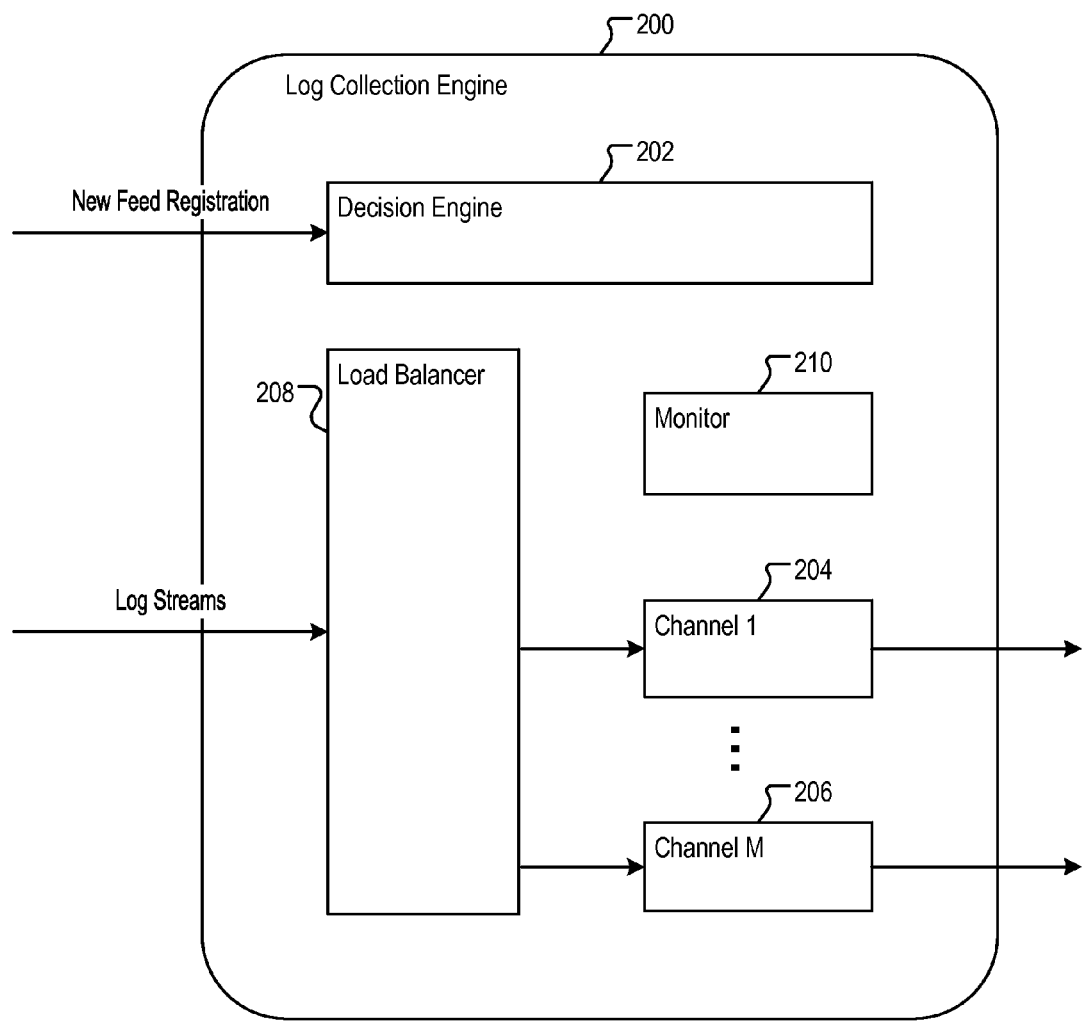
FIG. 2 is a block diagram of an example log collection engine that is configured to perform load balancing.

FIG. 2 is a block diagram of an example log collection engine 200 that is configured to perform load balancing. The log collection engine can be used in the distributed computing system 100 of FIG. 1.

The log collection engine includes a decision engine 202. The decision engine is configured to register new incoming feeds of streaming event data. The decision engine can receive requests to register new feeds from streaming event data providers, e.g., application and tenants hosted by applications in a multi-tenant environment. The decision engine can be implemented, e.g., using the Apache ZooKeeper™ architecture for distributed configuration services.

In response to receiving a request to register a new feed, the decision engine 202 allocates a networking connection for the new feed. For example, the decision engine can allocate a front end port or an IP address or both for the new feed. The decision engine then allocates a channel for the new feed and associates the allocated networking connection with the allocated channel. The log collection engine includes a first channel 204 through an Mth channel 206.

Each channel is configured to stage events from a streaming event data source until those events are consumed by a sink, e.g., a distributed file system. In some implementations, a channel is a passive storage structure that stores incoming event data. For example, a channel can be a software instance that stores event data in a local memory structure or a local file system until the log collecting engine can move the event data to a distributed file system having greater storage capacity than the local memory structure or local file system.

The channel can be implemented as an Apache Flume™ channel. In that case, the system can create multiple Flume instances, and each flume instance can allocate multiple channels. When the system allocates a new channel, it can attempt to evenly distribute the channels between the Flume instances, e.g., by allocating a new channel into the Flume instance having the least number of channels.

The log collection engine includes a load balancer 208. The load balancer is configured to receive data from registered feeds of streaming data. The load balancer redirects the data from the allocated networking connections to the allocated channels for the feeds. The load balancer can be implemented using an Nginx™ server and the iptables application available from netfilter.org.

The log collection engine includes a monitor 210. The monitor is configured to monitor the status of the channels. For example, the monitor can periodically request from each channel the amount of memory or network bandwidth that the channel is using or has used over a period of time. The monitor can be implemented using Java Management Extensions (JMX).

Based on the statuses of the channels, the monitor determines if any of the channels is experiencing a high load, e.g., by comparing the amount of memory or network bandwidth used by a channel with a threshold and determining that the channel is experiencing a high load if the amount exceeds the threshold. The threshold can be fixed or variable and can be based on a total amount of available computing resources for the system. The amount of memory or network bandwidth can be an absolute amount or a relative amount, e.g., relative to a total system memory or an amount of memory on a single computer in the distributed system.

The monitor reports to the decision engine if a feed is being directed to a channel that is determined to be experiencing a high load. The decision engine then sends a rebalance command to the load balancer. In response, the load balancer allocates one or more new channels for the feed and associates the allocated networking connection for the feed with the one or more new channels. The load balancer can then redirect streaming event data from the feed to the one or more new channels instead of or in addition to the old channel. In cases where there are multiple channels for a given feed, the load balancer can redirect feed data to each of the channels in parallel, or by sequentially sending a certain amount of data to each channel one after the other.

In some implementations, the load balancer can allocate a new channel for the feed by creating a new Flume instance and allocating the new channel within that new Flume instance. In some implementations, the load balancer can use a different computer or cluster of computers in the distributed computing system to accommodate a new channel or a new Flume instance. The different computer or cluster of computers can be new to the log collection engine, e.g., not previously or recently used by the log collection engine.

In some implementations, the number of new channels that is allocated to the feed is based on an amount by which the load on the old channel exceeds a threshold load. For example, the load balancer can determine the difference between a load metric for the load on the old channel and subtract the threshold load from the load metric, and then determine an estimate number of new channels to handle the load based on the difference.

In some implementations, after the load balancer associates the allocated networking connection for the feed to the one or more new channels, the load balancer deactivates the old channel. For example, the load balancer can mark the old channel to be deactivated by the log collection engine, which then waits until all of the events in the old channel have been consumed by one or more sinks. After all the events have been consumed, the log collection engine can then deallocate the computing resources allocated to the channel, freeing up those resources for the rest of the system.

Figure 3:
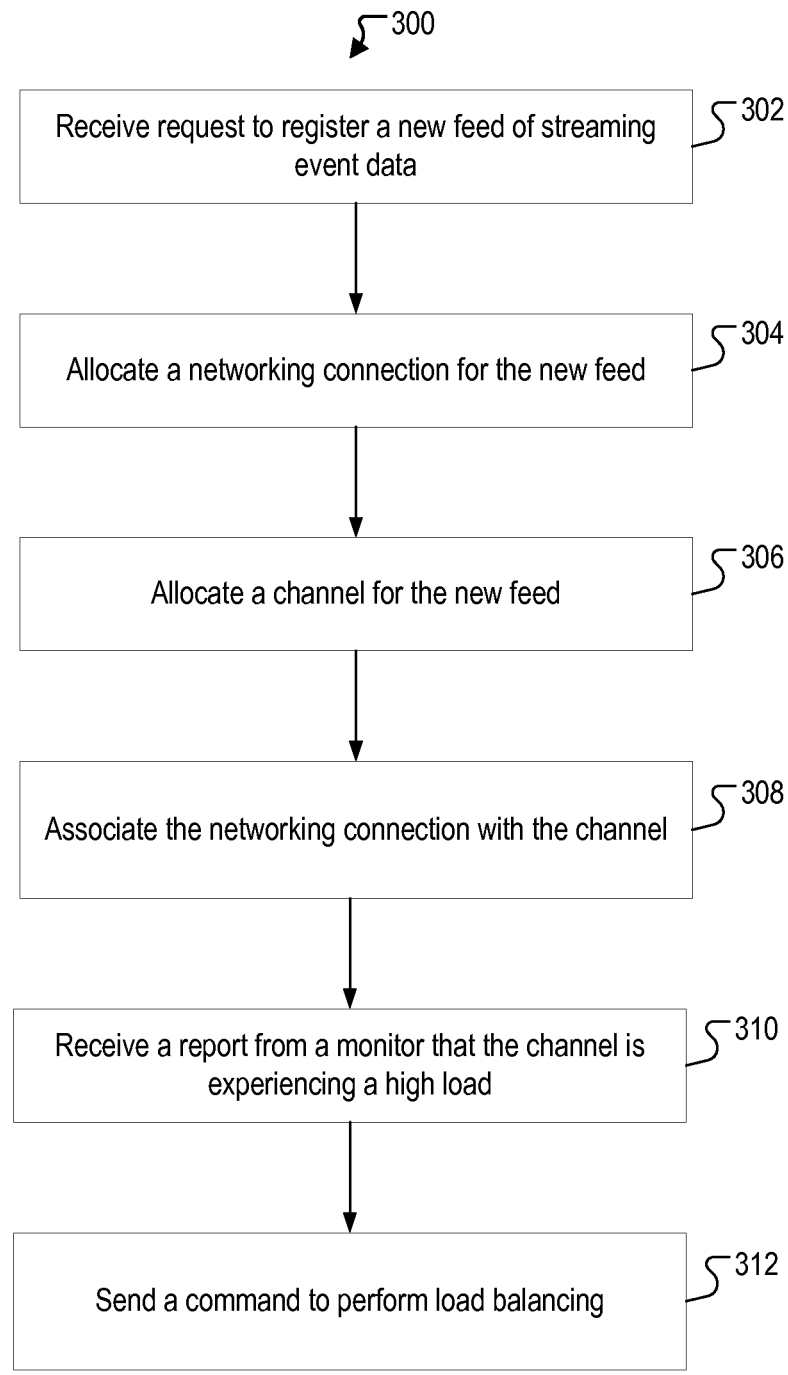
FIG. 3 is a flow chart of an example process performed by the decision engine of FIG. 2.

FIG. 3 is a flow chart of an example process 300 performed by the decision engine 202 of FIG. 2. The decision engine receives a request to register a new feed of streaming event data (302). The decision engine allocates a networking connection for the new feed (304). The decision engine allocates a channel for the new feed (306). The decision engine associates the networking connection with the channel (308), so that streaming event data for the feed will be redirected to the channel.

When the decision engine receives a report from a monitor that the channel is experiencing a high load (310), the decision engine sends a command to a load balancer to perform load balancing (312), i.e., to allocate one or more new channels for the feed.

Figure 4:
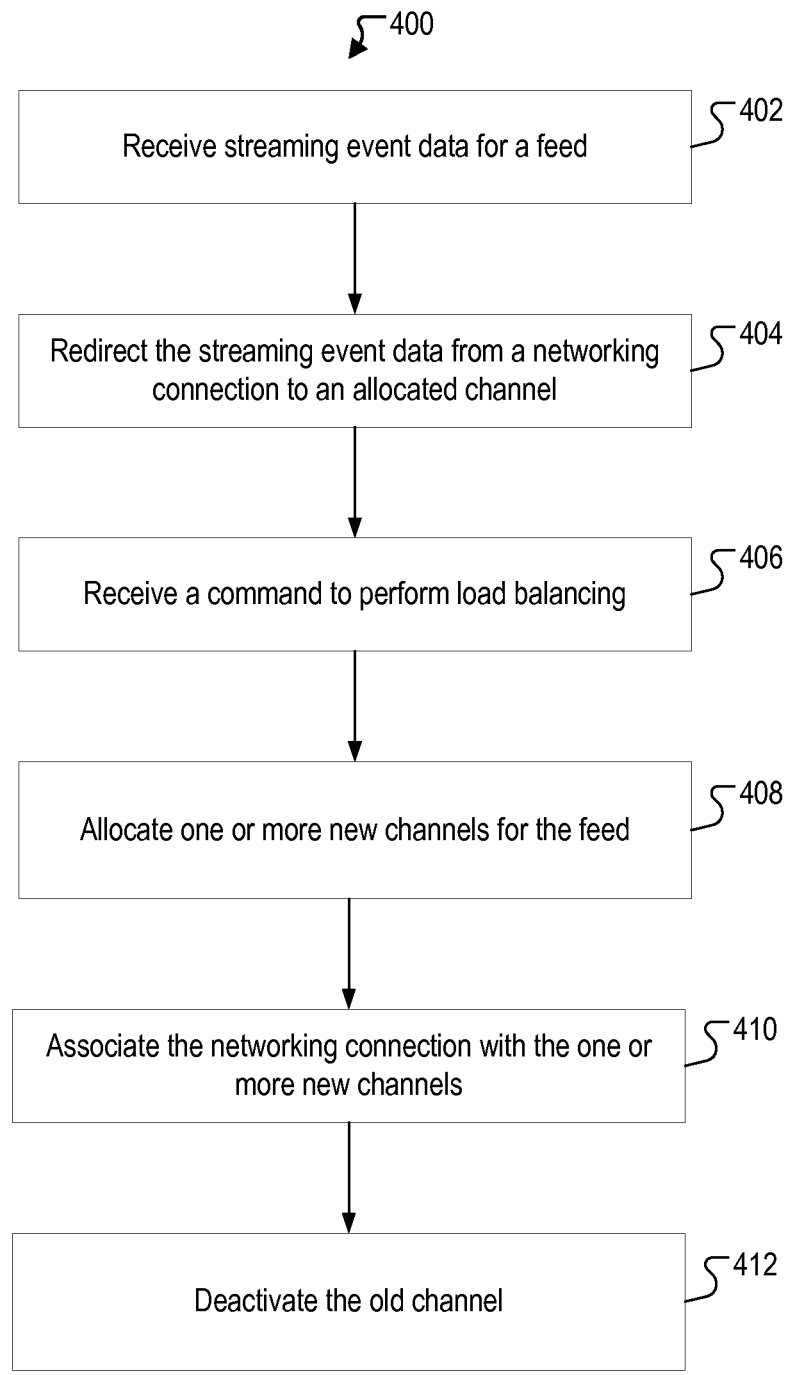
FIG. 4 is a flow chart of an example process performed by the load balancer of FIG. 2.

FIG. 4 is a flow chart of an example process 400 performed by the load balancer 208 of FIG. 2. The load balancer receives streaming event data for a feed (402). The load balancer redirects the streaming event data from its allocated networking connection to its allocated channel (404). The load balancer can continue to redirect the streaming event data until the feed is unregistered or until the load balancer receives a rebalance command.

At some point, the load balancer receives a command from a decision engine to allocate one or more new channels for the feed (406). In response, the load balancer allocates the one or more new channels for the feed (408). The load balancer associates the network connection with the one or more new channels (410). After associating the networking connection with the one or more new channels, the load balancer optionally deactivates the old channel (412).

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS)

receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. For example, the subject matter is described in context of scientific papers. The subject matter can apply to other indexed work that adds depth aspect to a search. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing can be advantageous.

What is claimed is:

1. A computer-implemented method comprising:
   receiving, in a distributed computing system comprising a plurality of computers, a plurality of feeds of streaming event data of a multi-tenant application having a plurality of tenants, wherein each feed of the plurality of feeds is generated by a respective tenant of the plurality of tenants of the multi-tenant application;
   routing feed data from each of the tenants of the multi-tenant application to a different respective channel of a plurality of channels, wherein each channel comprises a software process executing on one of the plurality of computers, wherein each channel of the plurality of channels is configured to receive and store feed data until the feed data is consumed by a data sink;
   computing a load metric for a first channel executing on a first computer of the plurality of computers, wherein the first channel is allocated to receive first feed data generated by a first tenant of the plurality of tenants of the multi-tenant application;
   determining that the load metric for the first channel exceeds a threshold;
   in response to determining that the load metric for the first channel exceeds the threshold, selecting, from among different quantities of allocable channels, a particular quantity of new channels for the first feed based on an amount by which the load metric exceeds the threshold;
   allocating the particular quantity of new channels for the first feed data generated by the first tenant of the plurality of tenants of the multi-tenant application; and
   redirecting feed data from the first tenant to the new channels instead of the first channel.

2. The method of claim 1, further comprising:
   before the first feed data is received from the first tenant of the plurality of tenants of the multi-tenant application, receiving a message from the first tenant; and
   in response to receiving the message from the first tenant:
      allocating the first channel for the first tenant so that the first channel receives only first feed data from the first tenant;
      allocating a networking connection for the first tenant, the networking connection being configured to receive first feed data from the first tenant; and
      associating the networking connection with the first channel so that the distributed computing system routes the first feed data from the first tenant from the networking connection to the first channel.

3. The method of claim 2, wherein redirecting the first feed data generated by the first tenant of the plurality of tenants of the multi-tenant application to the second channel includes associating the networking connection with the second channel.

4. The method of claim 3, further comprising, after associating the networking connection with the second channel, deallocating the first channel so that one or more computing resources of the distributed computing system used by the first channel become available for one or more other channels.

5. The method of claim 1, wherein computing the load metric for the first channel comprises determining an amount of memory or network bandwidth that is being used to execute the first channel on the first computer of the plurality of computers.

6. The method of claim 1, wherein the data sink is a distributed file system for the distributed computing system, wherein the method further comprises sinking a respective output from each of the channels to the distributed file system for the distributed computing system.

7. The method of claim 1, wherein the data sink is a data parsing engine configured to perform data analytics on feed data generated by tenants of the multi-tenant application, wherein the method further comprises sinking a respective output from each of the channels to the data parsing engine.

8. The method of claim 1, wherein each of the plurality of channels is configured to receive and store feed data in storage that is local to one or more computers or one or more clusters of computers in the distributed computing system, wherein the storage comprises random access memory (RAM) or mass storage or both.

9. The method of claim 1, wherein an instance of the multi-tenant application runs on the distributed computing system, wherein each tenant of the plurality of tenants is provided with access to the instance of the multi-tenant application that is running on the distributed computing system.

10. The method of claim 1, wherein the multi-tenant application has a software architecture that includes a plurality of different layers, wherein each tenant of the plurality of tenants is provided with access to a different respective set of one or more layers of the multi-tenant application's software architecture.

11. The method of claim 1, wherein the first channel comprises a first software process executing on the first computer of the plurality of computers, wherein the method further comprises:
after allocating the second channel, determining that the data sink has consumed all of the first feed data having been stored by the first channel; and
in response to determining that the data sink has consumed all of the first feed data having been stored by the first channel, terminating execution of the first software process on the first computer of the plurality of computers.

12. A distributed computing system comprising a plurality of physical computers configured to perform operations comprising:
receiving a plurality of feeds of streaming event data a plurality of feeds of streaming event data of a multi-tenant application having a plurality of tenants, wherein each feed of the plurality of feeds is generated by a respective tenant of the plurality of tenants of the multi-tenant application;
routing feed data from each of the tenants of the multi-tenant application to a different respective channel of a plurality of channels, wherein each channel comprises a software process executing on one of the plurality of computers, wherein each channel of the plurality of channels is configured to receive and store feed data until the feed data is consumed by a data sink;
computing a load metric for a first channel executing on a first computer of the plurality of computers, wherein the first channel is allocated to receive first feed data generated by a first tenant of the plurality of tenants of the multi-tenant application;
determining that the load metric for the first channel exceeds a threshold;
in response to determining that the load metric for the first channel exceeds the threshold, selecting, from among different quantities of allocable channels, a particular quantity of new channels for the first feed based on an amount by which the load metric exceeds the threshold;
allocating the particular quantity of new channels for the first feed data generated by the first tenant of the plurality of tenants of the multi-tenant application; and
redirecting feed data from the first tenant to the new channels instead of the first channel.

13. The distributed computing system of claim 12, the operations further comprising:
before the first feed data is received from the first tenant of the plurality of tenants of the multi-tenant application, receiving a message from the first tenant; and
in response to receiving the message from the first tenant:
allocating the first channel for the first tenant so that the first channel receives only first feed data from the first tenant;
allocating a networking connection for the first tenant, the networking connection being configured to receive first feed data from the first tenant; and
associating the networking connection with the first channel so that the distributed computing system routes the first feed data from the first tenant from the networking connection to the first channel.

14. The distributed computing system of claim 13, wherein redirecting first feed data generated by the first tenant of the plurality of tenants of the multi-tenant application to the second channel includes associating the networking connection with the second channel.

15. The distributed computing system of claim 14, the operations further comprising, after associating the networking connection with the second channel, deallocating the first channel so that one or more computing resources of the distributed computing system used by the first channel become available for one or more other channels.

16. The distributed computing system of claim 12, wherein computing the load metric for the first channel comprises determining an amount of memory or network bandwidth that is being used to execute the first channel on the first computer of the plurality of computers.

17. The distributed computing system of claim 12, wherein the data sink is a distributed file system for the distributed computing system, wherein the operations further comprise sinking a respective output from each of the channels to the distributed file system for the distributed computing system.

18. The distributed computing system of claim 12, wherein the data sink is a data parsing engine configured to perform data analytics on feed data generated by tenants of the multi-tenant application, wherein the operations further comprise sinking a respective output from each of the channels to the data parsing engine.

19. The distributed computing system of claim 12, wherein each of the plurality of channels is configured to receive and store feed data in storage that is local to one or more computers or one or more clusters of computers in the distributed computing system, wherein the storage comprises random access memory (RAM) or mass storage or both.

20. A non-transitory computer storage medium encoded with a computer program, the program comprising instructions that when executed by a distributed computing system of a plurality of physical computers causes the distributed computing system to perform operations comprising:
receiving a plurality of feeds of streaming event data a plurality of feeds of streaming event data of a multi-tenant application having a plurality of tenants, wherein each feed of the plurality of feeds is generated by a respective tenant of the plurality of tenants of the multi-tenant application;
routing feed data from each of the tenants of the multi-tenant application to a different respective channel of a plurality of channels, wherein each channel comprises a software process executing on one of the plurality of computers, wherein each channel of the plurality of channels is configured to receive and store feed data until the feed data is consumed by a data sink;
computing a load metric for a first channel executing on a first computer of the plurality of computers, wherein the first channel is allocated to receive first feed data generated by a first tenant of the plurality of tenants of the multi-tenant application;

determining that the load metric for the first channel exceeds a threshold;

in response to determining that the load metric for the first channel exceeds the threshold, selecting, from among different quantities of allocable channels, a particular quantity of new channels for the first feed based on an amount by which the load metric exceeds the threshold;

allocating the particular quantity of new channels for the first feed data generated by the first tenant of the plurality of tenants of the multi-tenant application; and redirecting feed data from the first tenant to the new channels instead of the first channel.

21. The computer storage medium of claim 20, the operations further comprising:

before the first feed data is received from the first tenant of the plurality of tenants of the multi-tenant application, receiving a message from the first tenant; and in response to receiving the message from the first tenant:
allocating the first channel for the first tenant so that the first channel receives only first feed data from the first tenant;
allocating a networking connection for the first tenant, the networking connection being configured to receive first feed data from the first tenant; and
associating the networking connection with the first channel so that the distributed computing system routes the first feed data from the first tenant from the networking connection to the first channel.

22. The computer storage medium of claim 21, wherein redirecting first feed data generated by the first tenant of the plurality of tenants of the multi-tenant application to the second channel includes associating the networking connection with the second channel.

23. The computer storage medium of claim 22, the operations further comprising, after associating the networking connection with the second channel, deallocating the first channel so that one or more computing resources of the distributed computing system used by the first channel become available for one or more other channels.

24. The computer storage medium of claim 20, wherein computing the load metric for the first channel comprises determining an amount of memory or network bandwidth that is being used to execute the first channel on the first computer of the plurality of computers.

25. The computer storage medium of claim 20, wherein the data sink is a distributed file system for the distributed computing system, wherein the operations further comprise sinking a respective output from each of the channels to the distributed file system for the distributed computing system.

26. The computer storage medium of claim 20, wherein the data sink is a data parsing engine configured to perform data analytics on feed data generated by tenants of the multi-tenant application, wherein the operations further comprise sinking a respective output from each of the channels to the data parsing engine.

27. The computer storage medium of claim 20, wherein each of the plurality of channels is configured to receive and store feed data in storage that is local to one or more computers or one or more clusters of computers in the distributed computing system, wherein the storage comprises random access memory (RAM) or mass storage or both.

* * * * *

UNITED STATES PATENT AND TRADEMARK OFFICE
CERTIFICATE OF CORRECTION

PATENT NO.      : 9,870,272 B2
APPLICATION NO. : 14/539049
DATED           : January 16, 2018
INVENTOR(S)     : Xiong Li et al.

Page 1 of 1

It is certified that error appears in the above-identified patent and that said Letters Patent is hereby corrected as shown below:

On the Title Page

Column 1, (71) Applicant: delete "San Fracisco," and insert --San Francisco,--, therefor.

Signed and Sealed this
Thirteenth Day of March, 2018

Andrei Iancu
*Director of the United States Patent and Trademark Office*